(12) United States Patent
Barbieux

(10) Patent No.: US 6,435,520 B2
(45) Date of Patent: Aug. 20, 2002

(54) HIGH PRECISION EXPANDING MANDREL WITH QUICK SLEEVE CHANGE

(75) Inventor: Jacques Barbieux, Louvres (FR)

(73) Assignee: Sandvik Tobler S.A., Louvres (FR)

( * ) Notice: Subject to any disclaimer, the term of this patent is extended or adjusted under 35 U.S.C. 154(b) by 0 days.

(21) Appl. No.: 09/769,287

(22) Filed: Jan. 26, 2001

(30) Foreign Application Priority Data

Jan. 28, 2000 (FR) .............................. 00 01150

(51) Int. Cl.⁷ .............................................. B23B 31/40
(52) U.S. Cl. ...................... 279/2.03; 279/2.04; 279/2.1; 279/43
(58) Field of Search ................ 279/2.04, 2.03, 279/2.1, 2.11, 2.12, 43, 51, 58; 242/573.8, 573.7

(56) References Cited

U.S. PATENT DOCUMENTS

| | | | |
|---|---|---|---|
| 1,427,155 A | | 8/1922 | Haven |
| 2,469,873 A | * | 5/1949 | Ernest .............................. 279/2 |
| 2,721,744 A | * | 10/1955 | Axelsson ...................... 279/58 |
| 4,088,332 A | * | 5/1978 | Chase ............................ 279/2 |
| 5,551,710 A | * | 9/1996 | Bruchman .................... 279/20 |
| 5,816,581 A | * | 10/1998 | Chase ......................... 279/2.03 |
| 5,868,400 A | * | 2/1999 | Davis ......................... 279/2.03 |

FOREIGN PATENT DOCUMENTS

FR          917.246          12/1946

* cited by examiner

*Primary Examiner*—Henry Tsai
(74) *Attorney, Agent, or Firm*—Finnegan, Henderson, Farabow, Garrett & Dunner, L.L.P.

(57) ABSTRACT

The invention provides an expanding mandrel comprising a shaft (1) having a conical forward end (10), an expanding sleeve (5) constituted by a ring provided with longitudinal slits designed to slide over said conical forward end (10), the inner wall of said sleeve (5) itself also having the shape of a cone the apex angle of which is equal to that of the conical forward end (10), and a tie member (2) designed to be connected to a rod that can be caused to slide along the axis of the machine spindle to control the gripping or the release of a workpiece. According to the invention, the sleeve (5) is connected to said tie member (2) via a control ring (3) integral with the tie member (2), and the mandrel comprises a removable quick mounting means enabling the sleeve (5) to be secured to said control ring (3).

2 Claims, 2 Drawing Sheets

HIGH PRECISION EXPANDING MANDREL WITH QUICK SLEEVE CHANGE

BACKGROUND OF THE INVENTION

1. Field of the Invention

The present invention relates to an expanding mandrel, that is to say to a mandrel designed to grip a workpiece to be machined (turning, grinding) by pressing an expanding portion of the mandrel against the walls of an axial bore provided in said workpiece.

2. Description of the Related Art

There is known a first type of expanding mandrel, the body ("mandrel shaft") of which comprises a forward portion having, prior to gripping, the shape of a hollow cylinder provided with several longitudinal slits. This split portion is caused to expand by sliding a countersunk head screw along its axis, so that the split portion assumes, during gripping, a conical shape the apex angle of which progressively increases. Said countersunk head screw is located at the end of a longitudinal tie member. When said mandrel is mounted on the machine spindle, a rod is screwed onto the tie member that can be caused to slide along the axis of the machine spindle to control the gripping or releasing of the workpiece. A locking nut can be used to secure the shaft of the mandrel to the forward face of the machine spindle.

Although this type of mandrel is relatively simple to manufacture, and inexpensive, it has a number of drawbacks. Firstly, conical expansion of the split portion is irregular, with the result that gripping lacks precision. Secondly, the split portion lacks rigidity and is liable to be deformed, or even fail, when the gripping mechanism is actuated in the presence or, which is worse, in the absence of a workpiece; in this case, the only way of replacing the defective part is to replace the entire mandrel. Similarly, the gripping diameter characterizing each mandrel is unique, to within one finishing operation, with the result that the user has to change mandrels when he wishes to machine a workpiece having a bore with a diameter that differs sufficiently from that of the previous workpiece. Such drawbacks are obviously time consuming and lead to considerable extra cost.

A second type of conventional mandrel (manufactured, moreover, by the Applicant of the present invention) is free of certain of these drawbacks. In this type of mandrel, the shaft has a forward part of a conical shape. Unlike the mandrel described above, it is the expanding portion in this case that will slide axially to effect gripping or releasing. This expanding portion is constituted by a ring provided with longitudinal slits ("the sleeve"), the inner wall of this sleeve having the shape of a cone, or taper, the apex angle of which is equal to that of the cone over which the sleeve slides; the outer surface of the sleeve thus remains rigorously cylindrical during its expansion, thus ensuring that the workpiece is gripped perfectly precisely and uniformly. In addition, there is no longer any risk of failure or plastic deformation of the sleeve when the control tie member is actuated, in the presence or in the absence of a workpiece. Finally, to change over from one workpiece to another having a different bore diameter, it suffices to replace the sleeve, and not the entire mandrel.

In this known mandrel, the sleeve extends rearwards via a coupling collar which is attached to the control tie member by means of a pin held in place by a ring encircling said collar. It takes some time to remove the sleeve from its coupling collar and to replace it with another, analogous sleeve. It has thus proved desirable, in order to be able to make the best possible use of the fact that this type of mandrel allows the expanding portion to be removed, to devise a system for fixing the sleeve to the mandrel that enables the sleeve to be changed quickly and easily.

SUMMARY OF THE INVENTION

The object of the present invention is thus to shorten considerably the time required to change sleeves, while, at the same time, retaining the advantages of this second type of conventional mandrel. For this purpose, it provides an expanding mandrel comprising a shaft having a conical forward end, an expanding sleeve constituted by a ring provided with longitudinal slits designed to slide over said conical forward end, the inner wall of the sleeve itself also having the shape of a cone the apex angle of which is equal to that of said conical forward end, and a tie member designed to be connected to a rod that can be caused to slide along the axis of the machine spindle to control the gripping or the release of a workpiece. According to the invention, said sleeve is connected to said tie member via a control ring integral with the tie member, and the mandrel comprises a removable quick mounting means enabling the sleeve to be secured to said control ring.

According to certain particular characteristics, the sleeve comprises radial projections, and said removable quick mounting means is constituted by a nut capable of being fixed on said control ring so as to trap the sleeve against the control ring by means of said radial projections.

BRIEF DESCRIPTION OF THE DRAWINGS

Further advantages, objects and characteristics of the present invention will emerge from the following description of a form of embodiment of the invention, presented by way of example, said description being based upon the annexed figures, wherein.

DESCRIPTION OF THE PREFERRED EMBODIMENT

Figure 1:
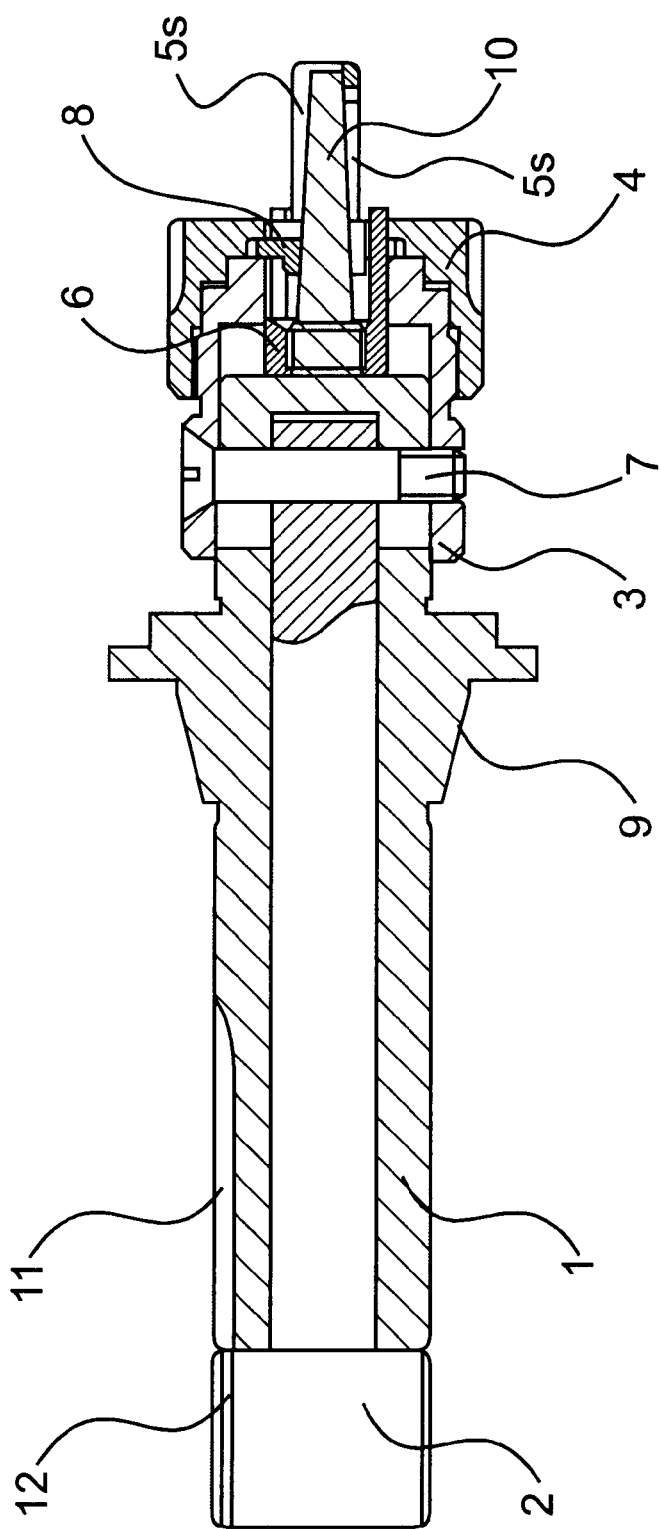
FIG. 1 is a longitudinal cross-section of an expanding mandrel according to the invention.
Figure 2:
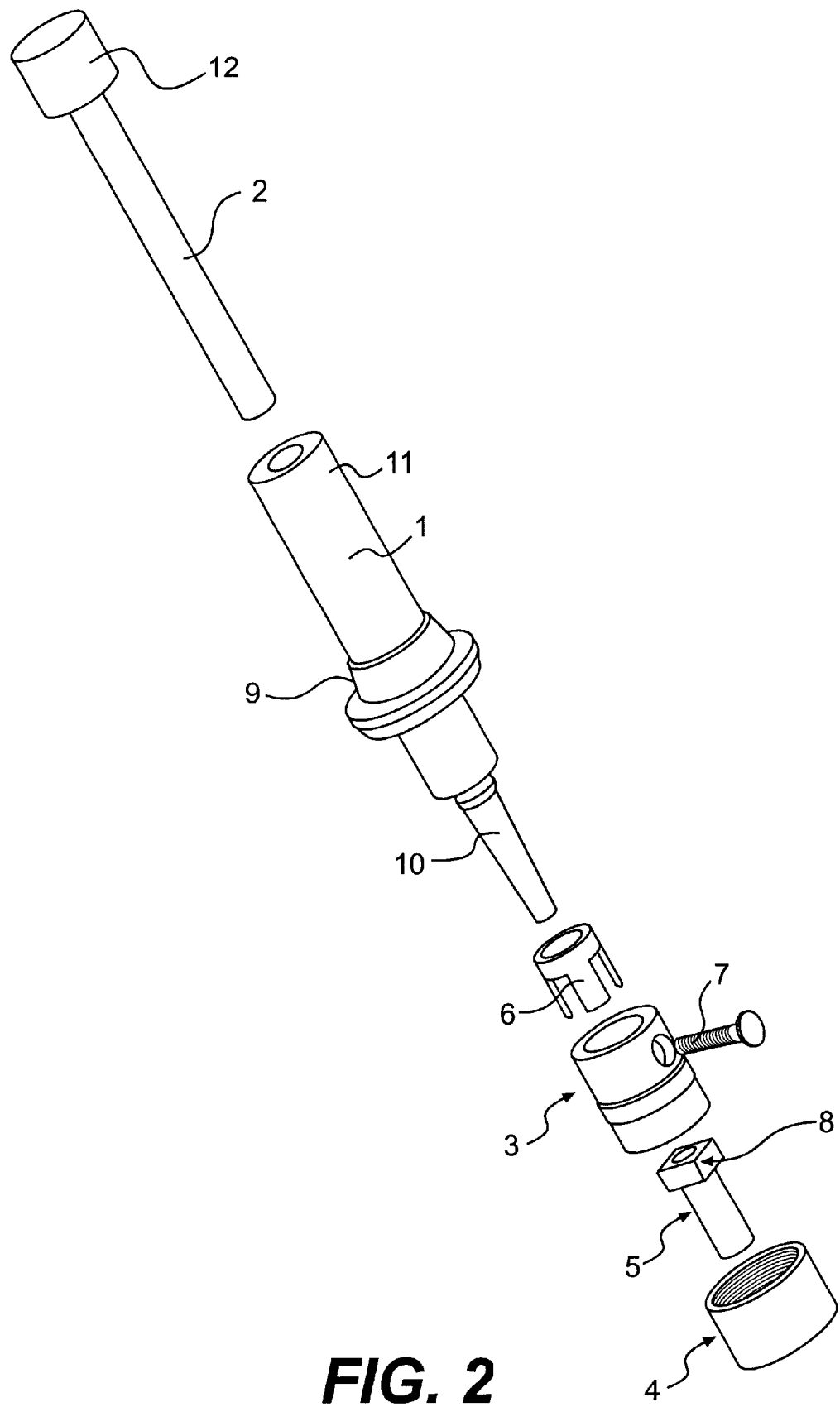
FIG. 2 is an exploded perspective view of the mandrel illustrated in FIG. 1.

The figures show a mandrel comprising a mandrel body ("shaft") 1 the rear portion of which is designed to be inserted into the bore of a machine spindle (not shown). The figures show, by way of example, the method of mounting that goes under the name of "standard W25": said bore has, at its forward end, a flared portion designed to receive conical part 9 of shaft 1, as well as a projection designed to be accommodated in a groove 11 in shaft 1 so as to determine the orientation of the mandrel when it is inserted into said bore.

A ring or sleeve 5, into which have been cut a number of longitudinal slits 5s, is capable of sliding axially on the forward, conically shaped end of shaft 1; the extent to which sleeve 5 can slide is limited rearwards by a stop 6 integral with shaft 1. The internal wall of sleeve 5 is, itself, also conical, so that said wall remains in contact with cone, or taper, 10, whatever the position of sleeve 5. Sleeve 5 can thus change diameter while retaining a perfectly cylindrical outer surface, the latter coming to bear against the walls of the bore of the workpiece (not shown) at the time of gripping, which is thus perfectly uniform. Gripping and release are controlled by means of a rod (not shown) sliding the axis of the machine spindle and connected to tie member 2 of the mandrel, which slides along the axis of shaft 1. When the mandrel is mounted on the machine spindle, said control rod is fixed (for example by screwing) on the rear portion of tie member 2 of the mandrel, said rear portion of tie member 2 further having a groove 12 located in the continuation of groove 11 of shaft 1 for the same insertion purposes.

According to the invention, sleeve 5 is connected to tie member 2 via a control ring 3 which has been made integral with tie member 2, for example by means of a radial screw 7. Finally, sleeve 5 comprises radial projections 8 enabling it to be trapped on control ring 3 by means of a nut 4 which can be screwed onto said ring 3.

The invention thus attains its objectives: the use can remove a sleeve 5 in a matter of seconds, simply by unscrewing nut 4, and by sliding sleeve 5 towards him; he can thus easily install a sleeve 5 having a different diameter. It will be noted that the invention affords this convenience of use while, at the same time, offering optimum gripping precision (in the order of a hundredth of a millimeter), and a device that is very robust as a whole.

Sleeves 5 will preferably be made of hardened steel so as to be wear-proof. As they are inexpensive, the user will be able to acquire, at low cost, a range of sleeves suited to his mandrel; gripping diameters may, for example, extend over a range of several millimeters at 0.5 mm intervals.

The form of embodiment of the invention described above has been presented by way of example to illustrate the principles of the present invention, but it is perfectly clear that a person skilled in the art can draw inspiration therefrom to produce other variants without thereby departing from the invention. For example, member 9 for mounting the mandrel on the machine spindle can be of any type (standard W 25, but also W20, W32, taper SA, metric taper, Morse taper, shank, or the like). Similarly, other means enabling sleeve 5 to be secured quickly to control ring 3 are, of course, possible, for example a spring and bayonet type collar.

What is claimed is:

1. An expanding mandrel comprising:

a fixed position shaft having a forward end with a conical surface having an axis and a defined apex angle;

a radially opposed expanding sleeve received on the conical surface, the sleeve having an inner conical wall surface, an outer workpiece supporting cylindrical surface, and longitudinal slits for adjusting an external diameter of the cylindrical surface by causing the inner conical wall surface to slide axially on the conical surface of the fixed position shaft, the inner conical wall surface having an apex angle equal to the apex angle of the shaft to maintain a full surface contact between opposed surfaces of the shaft and the sleeve;

a tie member for connection to a rod slidable along an axis of a machine spindle for adjusting the external diameter of the sleeve to control the gripping and the release of a workpiece, the sleeve being connected to the tie member via a control ring integral with the tie member; and securing means for quick mounting and release of the sleeve to and from the control ring.

2. The expanding mandrel of claim 1, wherein the sleeve comprises radial projections, and the securing means includes a nut fixable on the control ring to trap the sleeve against the control ring by engaging the radial projections.

* * * * *